INVENTOR.
WIJNAND LANGERAAR

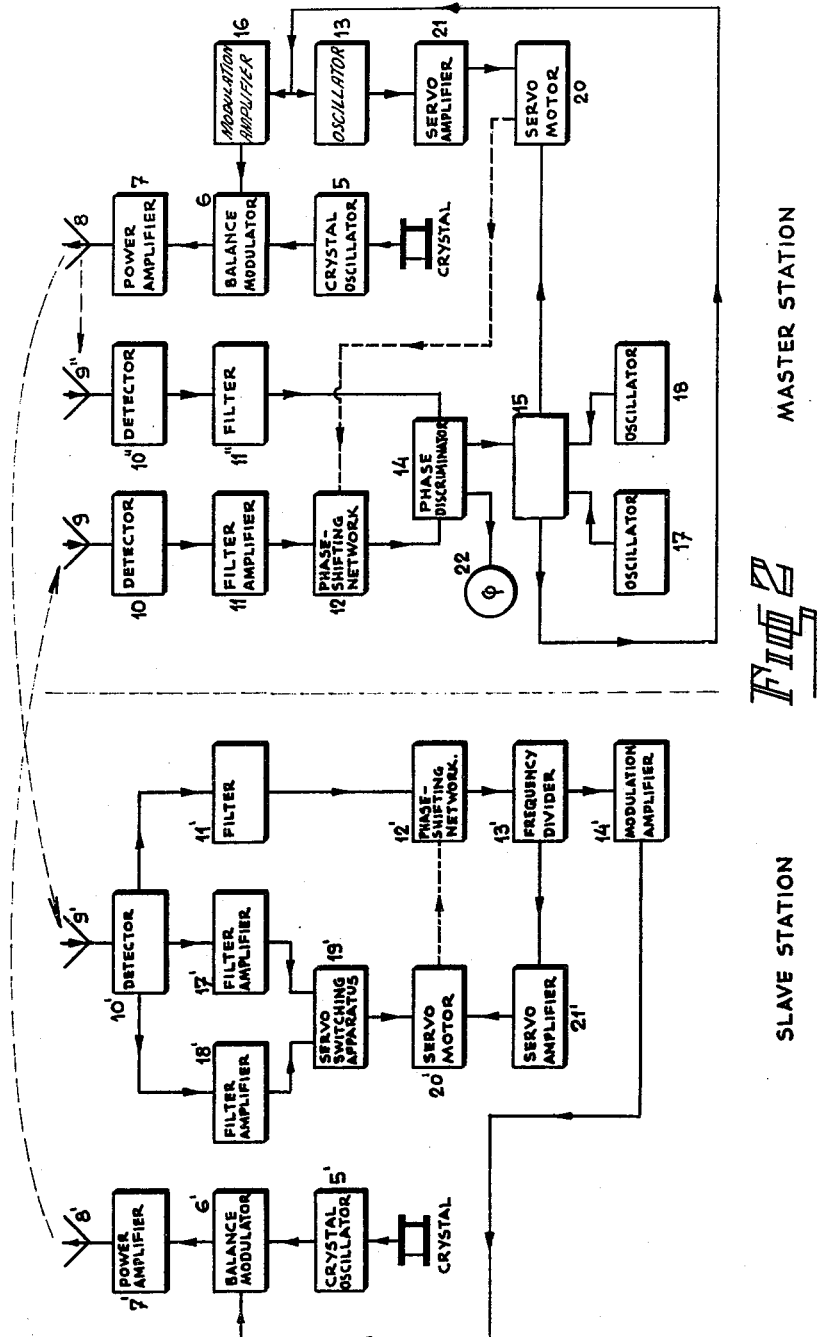

2,980,907
LONG-RANGE NAVIGATION SYSTEM

Wijnand Langeraar, C.S. Marine, Amsterdam, Netherlands

Filed Feb. 16, 1955, Ser. No. 488,689

Claims priority, application Netherlands Feb. 27, 1954

6 Claims. (Cl. 343—105)

This invention relates to radio navigation systems in general and, in particular to radio navigation systems which are based on phase comparison of signals received from transmitters spaced at least 1500 sea miles over water and 750 sea miles over land.

For such transmissions the LF- and VLF-bands are very suitable, because of the long distances which can be bridged by these frequencies. For navigation purposes the frequency bands of 90–110 kc. and 10–14 kc. have been appointed, while the bandwidth occupied therein by navigation system must be as small as possible.

Such navigation systems comprise a plurality of transmitters, which are situated at different locations and of which at least two operate simultaneously. A fixed phase relationship is maintained between the emissions of the various transmitters, whereby the phase relationship between these emissions as received at the receiving location becomes a function of only the position of said location relative to the positions of the various transmitters. Thus there exists a number of loci along which the phase difference of the emissions of two transmitters is of a given magnitude. These loci have the form of hyperbolas and in general as many hyperbolas along which the phase difference has a given magnitude will pass between two transmitters as the distance between these transmitters, commonly called the base length of the system, expressed in wave lengths that the emissions amount to.

The area between any two adjacent hyperbolas along which the phase difference is zero is commonly called a lane.

By employing two pairs of transmitters, which pairs may have one transmitter in common, two intersecting groups of hyperbolas may be obtained, whereby any location can be defined by the two hyperbolas passing therethrough. If more than one lane exists between any two transmitters of a cooperating pair of transmitters a certain amount of ambiguity is introduced, because a number of hyperbolas correspond to a given phase difference observed at the receiver location.

Although a number of methods have been developed to remove this ambiguity, such methods being known as lane identification systems, it is often desirable that a navigation system employ only one lane, as this considerably simplifies the apparatus both on the transmitter and on the receiver side.

Because of the large area covered by a lane in a one lane long range radio navigation system this requires extreme phase stability of the emissions in order that the position errors resulting from spurious phase shifts in the emissions be acceptable.

Due to the necessarily large base widths of a long range radio navigation system phase locking the emissions from two spaced locations by cable is obviously impractical. Therefore, the only possibility is phase locking by air. This is achieved by maintaining a fixed phase relationship between a pilot wave emitted by a first transmitter as received at the location of a second transmitter and the emission of said second transmitter. The pilot wave may consist of the emission which for navigation purposes is emitted by the first transmitter.

Although especially in the VLF band the phase stability of the propagation is relatively good as compared with higher frequencies it is not altogether insensitive to anomalies such as those caused by variable heights of the reflecting layer of the ionosphere and the atmospheric and ionospheric disturbances such as magnetic storms.

It is therefore necessary to constantly check and control the phase relationship of the radiations emitted by the various transmitters. If the phase anomalies occurring along the paths between the various transmitters are substantially equal it is moreover desirable that information about the existing deviations from standard conditions be passed to the receiver, whereby these deviations can be corrected automatically in the receiver.

It is the principal object of the present invention to provide an improved radio ravigation system in which phase anomalies along the radio path between master transmitter and slave transmitters are automatically compensated.

One feature of the present invention is a novel radio navigation system wherein the master transmitter is provided with a receiver, which receives the radiations from the slave transmitters and compares the phase thereof with the phase of a sample of the radiations from the master transmitter to obtain a correction signal which is a measure of the deviations from a predetermined phase relationship between the radiations from the master transmitter and those from the slave transmitters.

Another feature of the present invention is a novel radio navigation system wherein said correction signal is applied to shift the phase of the radiations from a slave transmitter fed to the comparator and is further applied to generate control signals which are representative for the phase deviations, said control signals being transmitted by the master transmitter.

Another feature of the present invention is a novel radio navigation system wherein the slave transmitters are provided with receivers for receiving the control signals radiated from the master transmitter and accordingly correcting the phase of the radiation emitted from the slave transmitters.

Another feature of the present invention is a novel radio navigation system wherein the master transmitter is provided with an auxiliary slave transmitter situated at the same location as the master transmitter, whereby receivers for use with the radio navigation system can be adjusted, even if their position with respect to the transmitters of the system is unknown.

The invention, taking into account the known disadvantages and trying to remove same, relates to a system, working, for example, in the 10–14 kc. band and is characterized in that the master transmitter transmits two frequencies with a determined difference-frequency, whereas the slave transmitters transmit two other frequencies with the same difference frequency and according to which at each transmitter group on the spot of the main transmitter a slave or auxiliary transmitter is provided. The master station is adapted to receive the signals from the slave stations and to compare them to the signal emitted by the master station itself. A correction signal is transmitted by the master station if the phase angle between the two signals compared differs from a predetermined value. The slave stations in their turn are equipped with apparatus for receiving said correction signal and for modifying the phase of the signal emitted by the slave station accordingly.

The invention now will be described on the basis of the drawings.

Fig. 2 is a block diagram of the invention showing the connections of the transmitters with the appertaining receivers.

Figure 1:
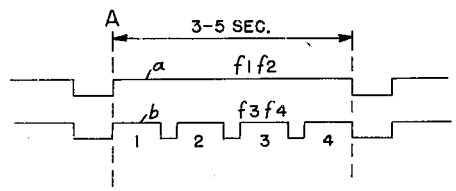
Fig. 1 is an explanatory diagram showing waveforms utilized in this invention.

The system according to the invention makes use of the measuring of the phase difference in order to keep the band width as small as possible, which is possible as the transmitter wave is continuous. The transmission advantageously takes place in the 12 kc. band as in said band the phase stability is very large. It is necessary to take into account a fairly strong atmospheric noise so that a large field strength will be necessary. On the other hand the attenuation will be much smaller than at higher frequencies. The signal-to-noise ratio can be improved by using very narrow filters, e.g. 1 cycle per second.

The navigation system according to the invention consists of a transmitter combination on the ground and a phase comparison apparatus and receiver on board a ship or plane.

The navigation system according to the invention consists of a master transmitter and two or more slaves, in which the master transmitter synchronizes the slaves and keeps up a constant phase difference with its own transmissions. A well-known navigation system utilizing phase comparison of signals received from spaced transmitters is DECCA, which employs a master station and several slave stations. The wave emitted by each slave station is phase-locked to the wave which the slave station receives from the master station. If the various stations are relatively closely spaced it can be safely assumed that there is a fixed phase relationship between the signal emitted from the master station and the same signal as received at the slave station, because the slave station then receives almost exclusively the ground wave of the master station, which has very constant propagation characteristics.

The phase locking of the emissions from the slave stations to the emission from the master transmitter can be symbolized by the use of vectors, in which M is taken to be the phase of the wave as emitted at the master. The wave emitted by the master as received at the slave station may be designated as $M_s$ and it is assumed that the phase angle $\theta$ between both vectors, M and $M_s$, is constant. The slave station is equipped with a receiver for the emission of the master station and the output signal of this receiver is fed to the transmitter of the slave station in such a way that there is a constant phase relationship between $M_s$ and the emission S from the slave station is shown, such angle being designated $\phi$.

Therefore the phase angle between the emissions from the master station and the slave station, M and S respectively, is the sum of two constant phase angles, $\theta$ and $\phi$ respectively, and is therefore also constant.

However, in the above it has been assumed that the phase angle $\theta$ is constant. If the slave station and the master station are spaced wide apart this is not a good assumption, because the slave station then receives not only the ground wave from the master station, but the sky wave as well. It is even possible that the latter will be much stronger than the ground wave. Since the reflecting layer in the ionosphere has by no means a constant height the length of the effective transmission path between master and slave may fluctuate. Thereby the phase angle $\theta$ also fluctuates by an amount $d\theta$. Now it appears that the phase angle between the transmission from the master station M and the transmission from the slave station S is $(\theta+d\theta+\phi)$ and is no longer constant but fluctuates by an amount $d\theta$.

In order to remedy this according to the invention the master station is equipped with a receiver for the emission from the slave station. Obviously, the transmission from the master station to the slave station will occur along the same propagation path as the transmission from the slave station to the master station, so the phase angle between M and $M_s$ will be equal to the phase angle between S and $S_m$, the emission of the slave station as received at the master station being designated $S_m$. The phase angle between the emission from the master station and the emission from the slave station as received by the master station will therefore be equal to $(2\theta+\phi)$ in the ideal case, or to $(2\theta+2d\theta+\phi)$ if the same propagation fluctuations occur as in the above-discussed case.

In the master station the signal $S_m$ is fed to a phase comparator, in which it is compared with the signal M. Any deviation of the phase angle between the signals M and $S_m$ indicates that there occurs a phase error on the propagation path from master to slave and vice versa. As shown above the deviation measured will be $2d\theta$ while the phase error occurring on the propagation path master to slave is actually $d\theta$. The error signal delivered by the comparator circuit is applied to generate an auxiliary signal which is transmitted by the master station and received by the slave station. On reception of this signal a steadily increasing phaseshift is introduced between the signal $M_s$ and the signal S. The sign of said phase shift depends on the nature of the auxiliary signal transmitted by the master, which in its turn depends on the sign of the phase error observed at the master. However, as soon as said auxiliary transmission starts, a steadily increasing phaseshift of the same sign is introduced in the channel which feeds the signal $S_m$ to the phase comparator. The phaseshifting means are made to operate synchronously, whereby the phase shift introduced in the slave station is always equal to the phase shift introduced in the master. Thus the phase angle between the emission of the master (M) and the emission from the slave, as fed to the comparator, $(S_m)$ will be $(2\theta+2d\theta+\phi-2e)$ where $e$ is the amount of phase shift introduced in both the slave station and the master.

As soon as $e$ has been increased to equal $d\theta$ it will be seen that the phase angle between the signals fed to the comparator (M and $S_m$ respectively) is now again $(2\theta+\phi)$, which is the normal situation, so the transmission of the auxiliary signals stops and the phase shifts introduced in the master and the slave respectively are maintained as they are.

Now the phase angle between the emission from the master and from the slave (M and S respectively) is again $(\theta+\phi)$ so the radiated pattern is correct, notwithstanding the fact that the phase angle between M and $M_s$ has changed from $(\theta)$ to $(\theta+d\theta)$.

In order to obtain channels or lanes of sufficient width it is desirable to carry out the phase-comparison at a frequency of substantially 1400 c.p.s. Said frequency in principle can be obtained:

(1) by means of frequency division of the waves transmitted by the transmitters (2) by means of modulation on the 12 kc. carriers (3) by means of beat frequencies between two waves transmitted by a transmitter.

The illustrated system advantageously makes use of the third principle, since frequency division is difficult when high demands are made to the phase stability and since modulation is undesirable as in practice it has appeared that ionosphere-reflection affects the phase stability of the modulation.

The use of a beat frequency has the disadvantage that two waves are to be transmitted simultaneously so that the power, radiated by the transmitter is decreased but the advantage is that the phase stability of the beat frequency is maintained.

According to the invention the beat frequency is chosen as low as possible such that both oscillations to be radiated by a transmitter differ only a little in frequency and will have substantially identical propagation and reflection characteristics. The beat frequency however may not be influenced by harmonics of the frequency of the power supply (50 or 60 c.p.s.). For this reason the invention makes use of a beat frequency of 140 c.p.s. in such a way that at a comparison frequency of 1400 c.p.s. a tenfold frequency multiplication will be necessary. It would be possible to give all transmitters of a system mutually different frequencies but the same beat frequency. However, for a transmission system consisting of a main transmitter and three slaves this would require a number of eight frequencies which is a disadvantage. For this reason the invention makes use of a time-distribution system in which all slaves use the same frequencies but which are separated in time, that is, they operate in succession.

For reasons to be explained hereinafter a slave or auxiliary transmitter is provided at the location of the master transmitter.

The master transmitter uses a group of frequencies which differs from that of the slaves, the latter all using the same frequency and in which for each transmitter system the beat frequency is 140 c.p.s. From the waveforms of Fig. 1 it appears diagrammatically how the cycle runs for a special transmitter system using time-spaced transmissions from the slave stations.

Figure 3:
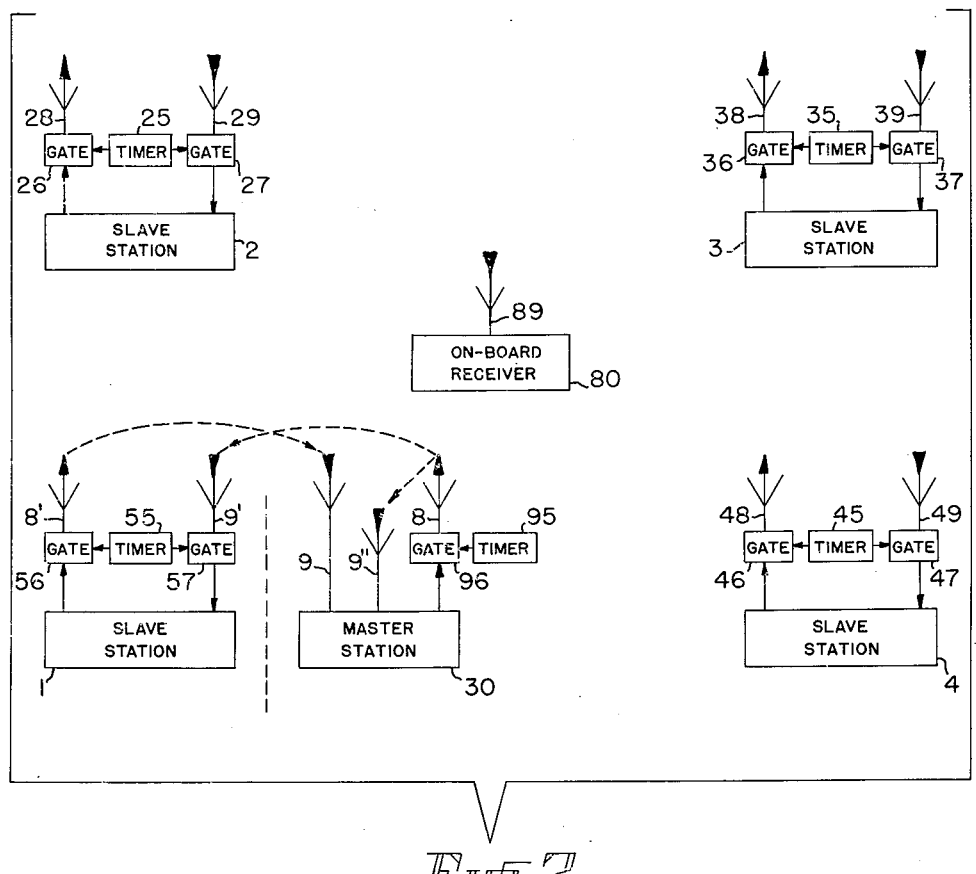
Fig. 3 is a block diagram showing a master station and a plurality of slave stations.

In Fig. 3 there is shown diagrammatically a master station 30 and a plurality of slave stations 1, 2, 3, and 4. The master station is equipped with a transmitter, the aerial of which is designated at 8, and two receivers, the aerials of which are designated at 9 and 9″. The slave stations 1, 2, 3, and 4 are each equipped with transmitters and receivers, the aerials of which are designated at 8′, 9′ and 28, 29 and 38, 39 and 48, 49, respectively. Also shown in Fig. 3 is an on-board receiver 80 which may be located on a plane or ship or other vehicle which is utilizing the navigation system and equipped with an aerial 89 as designated. The master station 30 and a slave station are shown in more detail in Fig. 2. Since all slave stations are substantially identical only one is represented in detail in Fig. 2.

Referring again to Fig. 1 at a certain moment A the master transmitter begins to radiate the frequencies $f_1$ and $f_2$, the difference frequency being 140 c.p.s. Said transmission carries on continuously for a period of 3 to 5 seconds. Thereafter the main transmitter stops for a short moment after which the second cycle starts, etc. Simultaneously with the master transmitter, i.e., at the moment A, the slave or auxiliary transmitter 1 appertaining to the master transmitter begins to transmit the frequencies $f_3$ and $f_4$, the difference frequency being also 140 c.p.s. The transmissions of the master transmitter and the slaves is schematically indicated by the curves $a$ and $b$. After a short time, approximately one second, the slave 1 stops after which the second, remote slave 2 begins to transmit and, as appears from Fig. 1, is followed by transmission periods from the slaves 3 and 4. As all slave transmitters use the same frequencies $f_3$ and $f_4$ the system requires only four frequencies. At the moment at which the slave 4 terminates its operation the master transmitter also completes the 3 to 5 second cycle and after a short time it begins again, etc. It is clear that the described method is such that the receiver needs only two channels, one for the master transmitter frequency and one for the slave frequencies.

At the beginning of the cycle the master transmitter and the appertaining slave transmit in equal phase in such a way that at the remote receiver a phase difference zero will be measured. This gives the opportunity to control an eventual detuning of the receiver channels each time at the start of a measuring cycle, a servo mechanism being utilized for the adjustment.

The system according to the invention contrary to certain known systems can operate without "lane-identification" which is an advantage in view of the complications involved thereby. If the starting point is a maximum uncertainty in the surmised estimate of 500 km. at the limit of the range of the system, i.e., on a distance of 2500–3000 km. for the transmitter, then the lane width at that spot must be at least 500 km., which at a lane expansion factor=4 corresponds with a lane width on the base line of at least 125 km. This involves using a comparison frequency corresponding with a wave length of at least 250 km. so that said frequency maximally must be 1200 c.p.s. For this reason in the receiver the beat frequency is three times doubled, said frequency being raised to 8 times 140 c.p.s. to 1120 c.p.s., before carrying out the phase comparison.

Before giving a more exact description of the system according to the invention on the basis of Fig. 2 some general considerations will follow.

Besides a great frequency stability of the master transmitter it is necessary that said transmitter keeps the slaves exactly in phase.

Since there are long distances to be bridged over (at least 1600 km.) precautions are to be taken to maintain the correct phase difference between the master transmitter and the slaves even for the small phase abnormalities as a consequence of the sky wave.

For this reason the phase of the beat frequency of the frequencies at the master transmitter received from a slave is compared with the frequency of the waves radiated by the master transmitter. At the master transmitter a constant phase difference of a predetermined value is to be measured.

Each deviation of the observed phase difference with respect to the calculated value corresponds with the double influence of the skywave as explained hereinbefore. A deviation in the phase of the slave observed at the master transmitter gives rise to a signal modulated on the normal transmission of the master transmitter. Hence in the slave the phase of the transmission is adjusted automatically till said adjustment signal disappears; i.e. at the master transmitter the normal phase difference is measured, whereby the necessity to oppose over-compensation of the slave must be taken into account. The adjusting mechanism operates in such a way that all slaves are corrected successively so that said adjustment requires only two frequencies. Eventually the on-board receivers of vessels or planes can be made sensitive to the adjustment signals of the master transmitter.

The duration of said signals is a measure for the value of the observed deviation in the place of the slave so that from said duration a correction can be derived of the phase differences observed in the on-board receiver of the ship or plane, which can be automatically introduced in the phase difference meters.

In Fig. 2 the diagram of a master transmitter and of a slave is indicated, the master transmitter at the right side of the dotted line and a slave transmitter left of this line.

In principal all transmitters are crystal controlled and they are modulated by a balance modulator so that the transmitted signal consists of two oscillations in the 10–14 kc. band with a frequency difference of 140 c.p.s., the modulation frequency being 70 c.p.s.

The master transmitter in principle consists of a crystal oscillator 5 with balance modulator 6 and a transmission amplifier 7, coupled with the transmitting aerial 8. In the slave the corresponding stages are indicated with 5′, 6′, 7′ and 8′. The master transmitter is charged with the control of the modulation of the slaves, said slaves being provided with a receiver, detecting the signals from the master transmitter, e.g. by means of a diode detector. Very narrow filters are used for reducing as much as possible the influence of atmospherics. In the receiving part of the slave the aerial is indicated by 9′ and the detector stage by 10′. The control signal receiver 10′ is such that a higher harmonic of the modulation frequency is passed by the narrow filter 11', said harmonic being fed to a frequency divider 13' via a phase correcting network 12', after which it is fed to a balance modulator 6' via a modulation amplifier 14'.

A beat frequency is derived in the filter 11' from the two frequencies transmitted by the master transmitter and this beat is of a frequency of 140 c.p.s The frequency divider 13' functions to divide this beat frequency of 140 c.p.s to a frequency of 70 c.p.s. which is fed to both the modulation amplifier 14' and the servo amplifier 21'. In the absence of this divided beat frequency the signal generated by the crystal oscillator 5' would be transmitted. The balance modulator 6' may be of any type well known to those skilled in the art. The function of unit 6' is as follows. Assume that the frequency of the signal generated by the crystal oscillator 5' is 10,000 c.p.s. and the frequency supplied from the modulation amplifier 14' is 70 c.p.s The balance modulator will then give rise to signals of frequencies of 9,930 c.p.s. and 10,070 c.p.s., respectively, suppressing the 10,000 c.p.s. signal entirely.

The signals transmitted by the slaves are received at the master transmitter and are fed to the receiver 10 of the slave signal by means of the aerial 9, after which the phase of the received beat frequency is compared with that of the signals transmitted by the master transmitter. It is namely an imperious requirement that the phases of the beat frequencies of the signals radiated by the master and slave transmitters are perfectly equal or have a constant difference. The output signals of the receiver 10 are fed to a phase discriminator over a filter amplifier 11 and a phase correcting device 12.

At the phase discriminator 14 the phase of the beat frequency transmitted by the slave and received by the aerial 9 is compared with the phase of the beat frequency radiated by the master transmitter and received by the aerial 9'', said frequency being fed to the phase discriminator 14 via the receiver 10'' and filter amplifier 11''. For the adjustment of the phase of the frequency transmitted by the slave with respect to the beat frequency transmitted by the master transmitter the phase comparison device at the master transmitter produces two tones, generated by oscillators 17, 18, which tones by means of the servo-switching apparatus 15 and amplifier 16, if necessary, can be added to the master signal at the balance modulator 6. So the result of the phase comparison in the phase discriminator 14 decides which of the correcting tones (that of oscillator 17 or of oscillator 18) will be passed by the switching apparatus 15 via the modulation amplifier 16, to be added to the master signal in the balance modulator 6. Frequencies of the oscillators 17 and 18 may be of the order of a few hundred cycles per second. However, since these frequencies are merely employed as signalling frequencies they need not fulfill any special requirements.

Thus the operation of the servo switching unit 15 serves two purposes. First, depending on the sign of the phase error detected by the phase discriminator 14 it feeds either the output signal of oscillator 17 or the output signal of oscillator 18 to the modulation amplifier 16. Neither of these frequencies are applied to the servo motor 20. Secondly, depending on the sign of the phase error detected by the discriminator 14 it controls the direction or rotation of servo motor 20. This may be accomplished in several well known ways, mechanically or electrically. The power for the servo motor 20 is always taken from the servo amplifier 21, regardless of the rotation senses, the direction or rotation being controlled by unit 15.

Said tones in the receiving part of the concerned slave can be selected and by means of the servo-mechanism they adjust a phase correcting network. The selection takes place in the filter amplifier 17', 18', controlling a servo switching apparatus 19', said apparatus via a servo motor 20' adjusts the phase correcting network 12'. Said network must be able to adjust continuously over 360° in one revolution of the control shaft in such a way that the point 360° coincides with the point 0°.

The first control tone signifies to the slave a phase control in one direction, the second tone an adjustment in the other direction, whereas if no control tone occurs there will be no phase adjustment.

As the slaves operate successively the receivers of the momentarily not operating slaves must be blocked. Both the blocking of operation of the receivers of the slaves and of the transmitters of the master and slave stations may be accomplished in the same manner by the use of electronic gating circuits. Such gating circuits are well known to those skilled in the art and function in the following manner. A gating circuit has an output when, and only when, all of a plurality of input signals are present, functioning in much the same manner as a switching circuit. Consider slave station 1 in Fig. 3. The gating circuits 56 and 57 are connected between the aerials 8' and 9' and their respective amplifier and detector stages. The aerial 9' will be presenting an input to the gating circuit 57 when, for example, the transmitter of the master station is transmitting. However, until the gating circuit has received the second of its two input signals it will not pass the emissions of the master transmitter to the detector stage of the slave station 1. Similarly, the gate 56 prevents any radiations from being transmitted by the slave transmitter from the aerial 8'.

The second input for both of the gating circuits may be supplied, for example, by a timer circuit 55. There are a variety of timers that are well known to those skilled in the art which will provide the desired output signal to gate the gating circuits 56 and 57. The combinations of gating circuits 96, and 26, 27 and 36, 37 and 46, 47 connected as shown with timers 95, 25, 35 and 45, respectively, function in the same manner as the timer-gating circuit combination of slave station 1.

To obtain the operating cycle as shown in Fig. 1 the timer 95 of the master station is set to gate the gating circuit, for example, for 3 to 5 seconds and then remove the gating signal, for example, for an interval of approximately one second. The timer 55 of slave station 1 is synchronized with the timer 95 so that the circuits 56 and 57 are gated starting simultaneously with the gating of circuit 96, but are gated only for an interval as shown in Fig. 1. The timer 25 is so synchronized with the timers 95 and 55 that when the timer 55 has ceased gating circuits 56 and 57 a short delay occurs and then the timer 25 gates the circuits 26 and 27 as shown in Fig. 1. Similarly, the timers 35 and 45 successively gate the circuits 36, 37 and 46, 47.

The timers may be synchronized to operate as described by various means. If the timers are of the electronic counter type they may be adjusted to deliver the above-described gating signals by attaching portable power supplies to all but the timer at the master stations, assembling the timers at the master station, and starting them on their predetermined synchronized timing cycles by applying the same starting pulse or signal to all simultaneously. The timing circuits could then be returned to their respective slave stations and have permanent power supplies attached thereto. The foregoing discussion on the timing and gating circuits is intended only to be exemplary of any of a number of ways well known to those skilled in the art to accomplish the cycle diagrammatically shown in Fig. 1 and discussed hereinbefore.

It is necessary that both phase correcting networks 12, 12' give equal corrections (both half of the deviation observed at the master transmitter). For this reason the servo motors 20, 20' must operate synchronously, which is obtained by supplying the motors with the 70 c.p.s. modulation frequency. The servo motor 20' of the slave is fed by the frequency divider 13' via the servo amplifier 21'. In the master transmitter the servo motor 20 is fed in a similar manner by the 70 c.p.s. oscillator 13 via servo amplifier 21. The oscillator 13 also supplies a 70 c.p.s. input signal to the modulation amplifier 16. The direction of rotation of the motors 20, 20' is always the same and is determined in the master by means of the oscillators 17 or 18 over the servo-switching device 15 and in the slaves by means of the filter amplifiers 17' or 18' via the servo switching device 19'.

In this manner it is obtained that the deviation observed in the phase discriminator 14 is corrected half in the transmitter channel and half in the receiver channel of the master transmitter in such way that phase-abnormalities are corrected on the forward as well as the backward course. The phase meter 22 indicates the result of the phase discriminator.

In conclusion, it is pointed out that while the illustrated example constitutes a practical embodiment of my invention, I do not limit myself to the exact details shown, since modification may be made without departing from the spirit and scope of this invention.

I claim:

1. A radio navigation system comprising a master station and a plurality of slave stations; said master station being adapted to transmit a normal transmission of first and second frequencies differing in frequency by a low frequency $f$ and being further adapted to transmit a signal modulated on said normal transmission; each of said slave stations comprising a receiver adapted to receive said first and second frequencies transmitted by said master station and derive therefrom a beat frequency, a transmitter adapted to utilize a division of said beat frequency to modulate a predetermined generated frequency to produce a third and a fourth frequency, said third and fourth frequencies differing in frequency by said low frequency $f$, and means controlling the phase of said beat frequency in response to said signal modulated on the normal transmission of the master station transmitter.

2. A master station for use in a navigation system, comprising, a transmitter adapted to transmit a first and a second frequency and also adapted to control a slave station, a receiver adapted to receive a third and a fourth frequency from said slave station, means for deriving a first beat frequency from said first and second frequency, means for deriving a second beat frequency from said third and fourth frequencies, a phase discriminator adapted to compare said first and second beat frequencies and provide a control signal which varies in accordance with the difference between the phases of said beat frequencies, a control device responsive to said control signal for varying the phase of said second beat frequency before it is applied to said phase discriminator, and means regulated by said control device for applying a modulation signal to the transmitter, to thereby control said slave station in response to the reception of said third and fourth frequencies.

3. A master station according to claim 2 wherein said control device is adapted to vary the phase shift of said second beat frequency before it is applied to the phase discriminator in accordance with the modulated signal transmitted by the master station.

4. An electrical system comprising a master station and a plurality of slave stations; said master station being adapted to transmit first and second frequencies differing in frequency by a low frequency $f$; each of said slave stations comprising a receiver and a slave transmitter, said receiver adapted to receive said first and second frequencies transmitted by said master station and derive therefrom a first beat frequency, and means responsive to said beat frequency to modulate a predetermined generated frequency to produce a pair of frequencies for transmission from said slave station; said master station having a receiver adapted to receive said pair of frequencies from a slave station and derive therefrom a second beat frequency; said master station having means for deriving said beat frequency from its own transmissions and comparing the phases of said second beat frequency and said first beat frequency and generating a control signal in accordance with a difference in said phases; control means in said master station, responsive to said control signal, adapted to vary the phase of said second beat frequency and also adapted to supply a correction signal to be transmitted from said master station; each said slave station having control means, responsive to said transmitted correction signal, adapted to vary the phase of said first beat frequency.

5. An electrical system according to claim 4 including synchronizing means wherein said control means in said master station and said control means in each said slave station are operative to vary the respective phases of said second and said first beat frequencies synchronously.

6. A radio navigation system comprising a master station and a plurality of slave stations; each of said master and said slave stations being adapted to transmit characteristic signals; said master station comprising means for receiving said transmitted signals from said slave stations, means for comparing the phase angle deviation of said signals from said slave stations with a signal transmitted by said master station, and means for transmitting a correction signal in response to said phase angle deviation; each of said sleeve stations comprising means for receiving said correction signal and means modifying the phase angle of said characteristic signal transmitted by said slave station in response to said correction signal.

References Cited in the file of this patent

UNITED STATES PATENTS

| | | |
|---|---|---|
| 2,490,394 | Williams | Dec. 6, 1949 |
| 2,502,662 | Mitchell et al. | Apr. 4, 1950 |
| 2,541,627 | Williams | Feb. 13, 1951 |
| 2,611,127 | Palmer | Sept. 16, 1952 |
| 2,651,032 | Torcheux et al. | Sept. 1, 1953 |